Patented Mar. 22, 1938

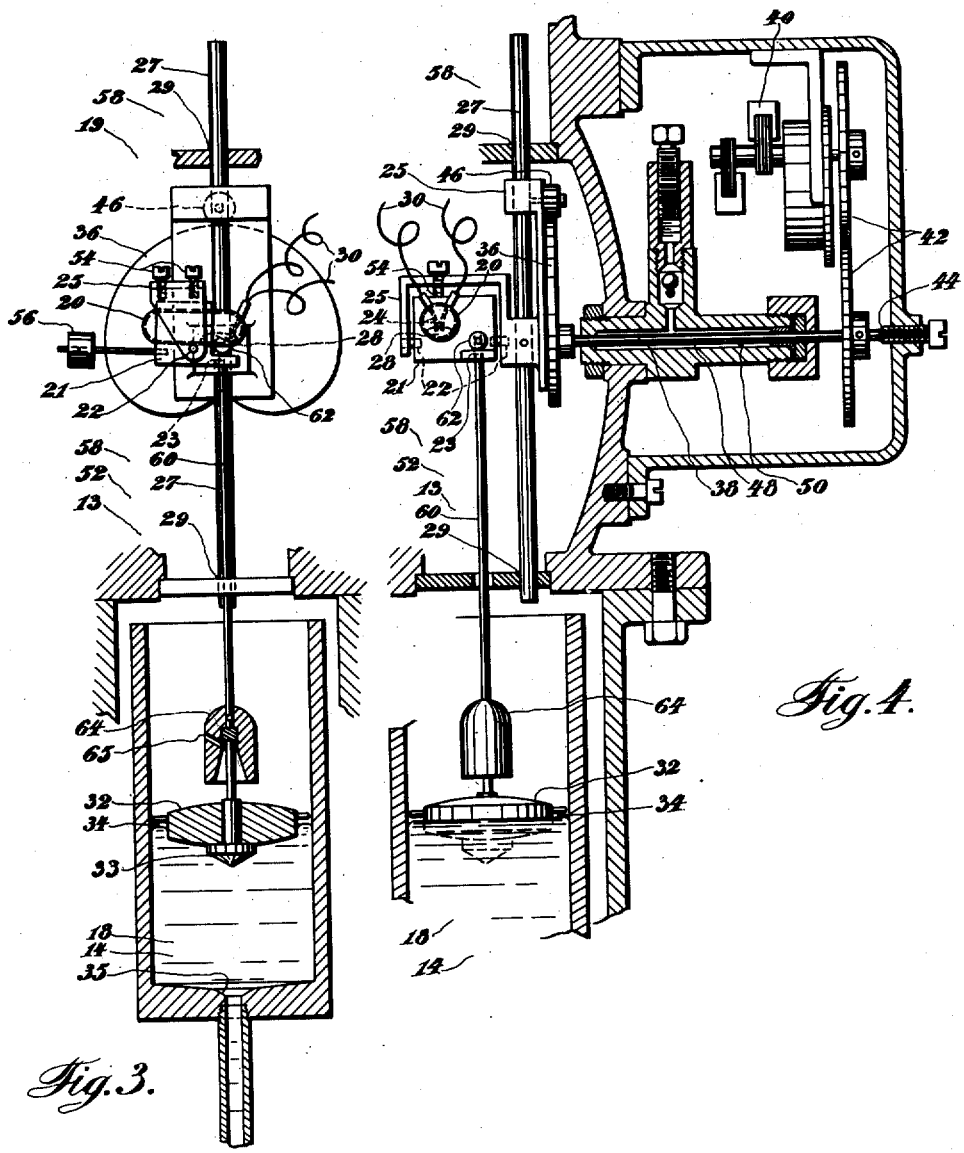

2,111,679

UNITED STATES PATENT OFFICE 2,111,679

TELEMETRIC TRANSMITTER

John C. Thoresen, Providence, R. I., assignor to Builders Iron Foundry, Providence, R. I., a corporation of Rhode Island Application July 28, 1933, Serial No. 682,623

11 Claims. (Cl. 73—205)

My invention relates to improvements in transmitters particularly adapted for telemetric use, especially in connection with fluid-responsive quantities. Transmitters of this type are shown in my co-pending application, Ser. No. 621,022, filed July 6, 1932, of which the present application forms a continuation in part.

Other previous transmitters are subject to contact deterioration and other difficulties with consequent unreliability of transmission. They further produce interrupted signals having an unsuitable character for use in such telemetric systems as require a continuous signal for proper operation of the receiver.

One object of my invention is to provide an improved transmitter capable of transmitting repeated substantial signalling currents indefinitely without pitting or other deterioration of the contact points.

Another object of my invention is to provide a transmitter producing positive, non-flickering contacts and hence uninterrupted signalling indications.

Still another object of my invention is to obtain signalling contacts, within a fluid containing chamber, unaffected by changes in the character of the fluid therein.

A further object of my invention is to provide a transmitter with a contactor that is free from maintenance in continued service.

Still a further object of my invention is to provide a transmitter, capable of producing signals of a time duration corresponding with a quantity, with a highly sensitive, responsive, precise and yet reliable contactor that requires minimum effort for its operation.

With these and further objects, which later will be made apparent, I will now describe the preferred embodiment of my invention as illustrated in the drawings.

In the drawings:

Figs. 1 and 2 are on the same scale to show the relation of these parts to the whole.

Fig. 3 is a front elevation principally in section, showing in detail the transmitter's sealed mercury switch and operating means therefor.

Fig. 4 is a side elevation made to the same scale as Fig. 3 and showing the same operating parts.

Figures 1, 2:
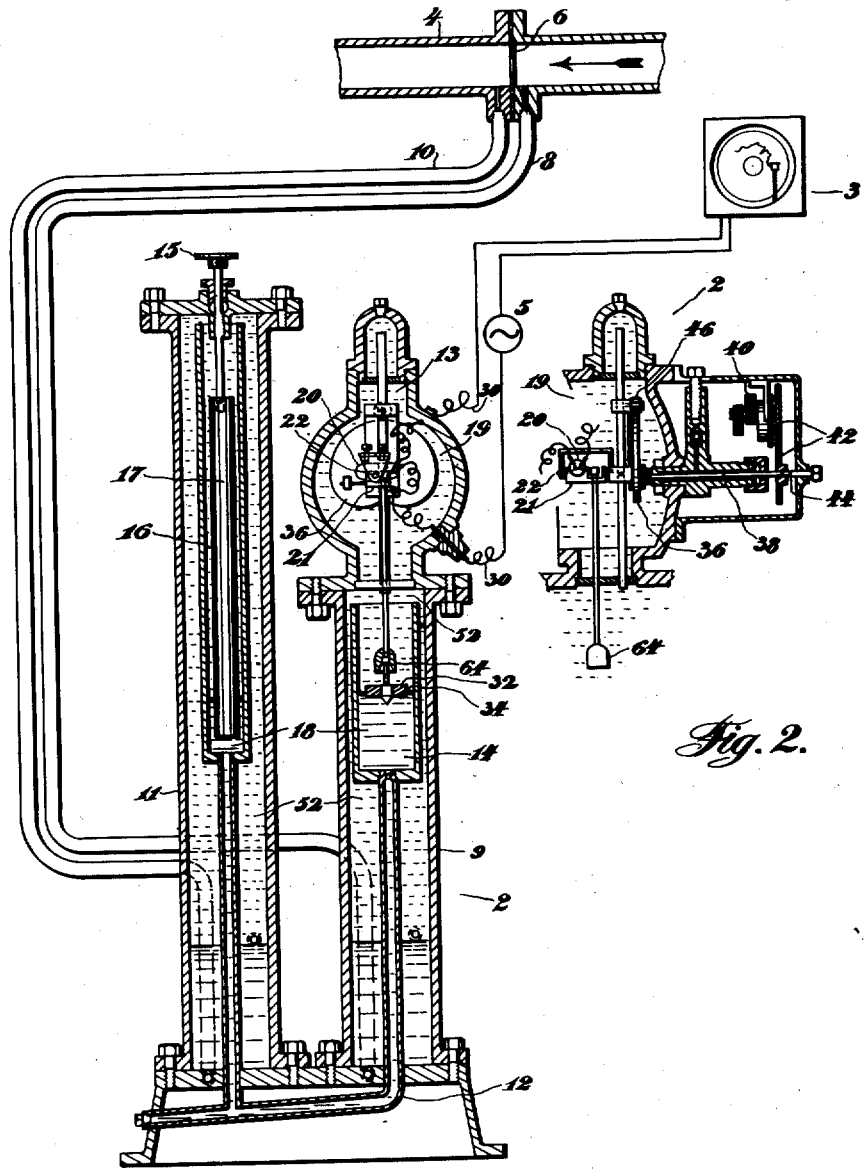
Fig. 1 is a front elevation, principally shown in section, of my complete telemeter. This partially diagrammatic view shows the transmitter attached by pressure pipes to a conduit containing a differential producer for telemetering the rate of flow of fluid through the conduit.
Fig. 2 is a side elevation of the contact controlling means of the transmitter and the driving means therefor.

In the drawings, wherein like characters of reference indicate like parts throughout, 2 indicates generally an improved telemetric transmitter constructed in accordance with my invention. In the same circuit 30 with the transmitter 2 are a telemetric receiver 3, actuated thereby, and a current supply 5.

A quantity, such as the rate of flow of a fluid through a conduit 4, is desired to be telemetered. An orifice plate 6 is positioned in conduit 4 between two pressure pipes 8 and 10 connected to said conduit respectively up- and downstream of said orifice. A pressure differential between 8 and 10 is accompanied by a rate of flow through said conduit substantially proportional to the square root of said pressure differential. The combination of conduit 4, orifice 6 and pressure connections 8 and 10 is known in the art as the pressure differential producer of a rate of flow meter.

The pressure differential is conveyed by the pipes 8 and 10 to the transmitter 2 connected thereto, this transmitter therefore being broadly fluid responsive.

The transmitter consists of a U-tube 12 having two legs 14 and 16 for high and low pressure connected respectively to pipes 8 and 10, and containing a manometric liquid 18, mercury as shown, displaceable substantially proportionally to the above pressure differential which in turn is related to said flow rate.

In leg 16 of the U-tube, I provide an adjustable displacer to enable the manometric liquid surface 34 to be set to its proper height at zero pressure differential regardless of minor changes of level, temperature, and other disturbing factors.

In the embodiment shown in Fig. 1, the rate of flow of a liquid, e. g., water, in conduit 4 is being telemetered. In this case, water fills the connecting pipes 8 and 10 and at zero pressure differential rises to the same level in the wells 9 and 11 respectively surrounding legs 14 and 16 of the U-tube 12 and connected to the tops thereof. Over the water is liquid 52 that is lighter than the water and also than the mercury and further is neither miscible with the water nor tends to form an emulsion with the mercury. In other words, a "transformer oil" may be used. The water-oil level is originally obtained by simply putting in an excess of oil and then admitting water until it escapes at the plugs shown at the separation surface. No subsequent appreciable changes can occur except in the accident of a leak. This insulating liquid accurately transfers the pressure differential to the manometric liquid 18 in the U-tube.

In a fluid-containing chamber 13 above the liquid 18 in one leg 14 of the U-tube, I provide a contact controller 19, including a sealed mercury switch 20. This is pivotally mounted at 22 and contains contact points 24 adapted to be bridged by a mercury globule 28 to complete a telemetric circuit 30 in which it forms a switch. This telemetric circuit includes a receiver indicated diagrammatically at 3, and which may be of any suitable type.

In this same U-tube leg 14, I provide a float 32 on the surface 34 of said manometric liquid 18, said float being displaced substantially proportional to a quantity, the pressure differential in this case. This float is provided with a check 33, adapted to seat on the seat 35 and so prevent an excess pressure differential from forcing the manometric liquid 18 from leg 14 of the U-tube, thus maintaining a proper seal at all times.

Above this float 32, I provide a cam 36 attached to a shaft 38 rotated at constant speed by the synchronous motor clock means 40 through the medium of the spur gearing 42. In my preferred embodiment shown this cam is a square root cam.

I provide at the outer end of shaft 38 an adjustable thrust bearing 44, which construction frees the clock means 40 of this force, which is large at the high pressures common in modern industries, and the gearing 42 thus transmits only the small torque necessary to drive the shaft 38 at constant speed.

I provide this shaft 38 with a stuffing box 48 containing a plastic 50, such as grease, so that the fluid 52, within said fluid containing chamber 13, may not leak therefrom. This fluid 52 is preferably an insulating and lubricating liquid as well as being non-emulsifiable with the manometric liquid 18 as heretofore described.

A cam roller 46 coacts with said cam 36 to actuate the contact former 19, or controller, through a regular cycle between two limits, one of which corresponds substantially with the minimum and the other with the maximum value of the quantity to be transmitted.

The square root cam 36 aforesaid is so designed that the displacement of the roller 46 from its zero position varies as the square of the angle, so that the time duration for a given displacement is proportional to the square root of this displacement, wherefore said transmitter may be said to operate in square root cycles. For a minute displacement this cam turns through an appreciable angle, thus giving greater accuracy and reliability at such small displacements than has hitherto been accomplished.

I also believe that I am the first to telemetrically transmit the square root of any quantity by a sensitive sealed mercury switch, particularly in fluid metering where the pressure differential $h$ is relatively small at low rates; for example at 1/20th of the maximum rate the pressure differential $h$ is only 1/400th of that at the maximum rate. The sealed mercury switch, due to its sensitivity and positiveness, is of decided advantage in enabling wide variations to be covered, particularly in metering rates of flow, wherein it is necessary to telemeter very accurately.

The sealed switch 20 is carried by a movable bracket member 25 that is reciprocated in a vertical path by the cam roller 46 pivotally attached thereto. The bracket 25 is attached to a guide rod 27 constrained to move vertically by the guide holes 29 in the stationary body of the transmitter. The plane surface of the movable bracket member 25 is wide and bears loosely against the plane face of cam 36 so that the bracket 25 is constrained against twisting, thus maintaining the proper relation between cam roller 46 and cam 36. The contact controller 19 is provided with stops 54 that limit the tilting of the sealed mercury switch 20 so that sensitivity and certainty of operation are ensured.

A counterweight 56 attached to one end of the sealed switch 20 is adapted to tilt this end downward so that the mercury globule 28 is impelled by the force of gravity in that direction which thus frees the contact points 24 of the mercury globule 28, thus opening the switch and changing the condition of the electric circuit 30 attached thereto.

On the opposite side of the pivot 22, I provide means 58 to tilt the sealed mercury switch 20 to make the contact for a portion of the cycle dependent upon said flow rate. This includes a rod member 60 adapted to be alternately positioned at its upper end 62 by the time-responsive means carried by cam roller 46, and at its lower end 64 by the quantity responsive means, i. e., the float 32. The weight of this rod 60 is carried by the sealed switch mounting 21 where the rod 60 passes through a hole 23 therein adapted to guide said rod without appreciable friction. The upper end 62 of the rod is larger than the shank of the rod, being adapted to abut the top of the sides of hole 23. The lower end 64 of the rod 60 is provided with guiding means and adapted to abut the float 32 to be carried thereby when not lifted at its upper end 62. An air-hole 65 is provided in rod end 64 to eliminate any air trap there so that the fluid containing chamber is completely filled with liquid in service.

When the rod 60 is carried clear of the float 32, its weight overcomes that of the counterweight 56 and tilts the sealed mercury switch 20 to abut one of its stops 54. The mercury globule 28 rolls to the end carrying the rod 60 and the top-heavy switch mounting 21 shifts its center of gravity across the pivot, both of which tend to maintain the switch in its then position regardless of minor variations of the quantity. The mercury globule 28 rolls into impacting contact with its contact points 24 so as to break through the film maintained by surface tension and thus to make positive, low-resistance contact between said points and the body of the mercury. The contact similarly breaks positively immediately after rod 60 rests on float 32. Obviously the switch 20 will maintain its position and contact condition as long as rod 60 continues to rest on float 32, which it does, due to the motion of the cam 36 and cam roller 46 regardless of minor changes of the float position, until the cam 36 again raises cam roller 46 and the contact controller 19 generally, including the rod 60 so that rod 60 again clears the float 32. In other words, when, during a cycle of rotation of the cam 36, the switch 20 is tilted by its counterweight 56 into circuit breaking position, in response to the engagement of rod 60 with the float, immediately subsequent minor variations of the float position will not affect the position of said switch; but instead the latter will be held in circuit breaking position by its top-heavy construction and by the mercury globule (which has rolled to the opposite side of pivot 22) until, at a subsequent point in the cycle, the rod 60 is raised from engagement with said float and tilts the switch into circuit closing position. Immediately subsequent minor variations in the float position cannot disturb the setting of the switch in said circuit closing position and the latter will be held therein by its top-heavy construction and the displacement of the mercury globule until, in the continued rotation of the cam, said rod is again engaged with said float. Rapid changing or "flickering" of the contact and telemetric signals is thus avoided during any portion of the cycle. Utmost accuracy and precision of telemetering are thereby obtained, while retaining the advantage of a sensitive sealed conducting liquid switch in the transmitter.

It is apparent that this provides uninterrupted signalling indications for a portion of the cycle dependent upon the quantity. Since the cyclically moving means is operated by the constant speed clock means 40 it follows that the time durations of these signalling indications are also dependent upon the position of a quantity responsive member (float 32) and hence upon the quantity.

The operation of my improved invention is obvious from the above description. It is to be seen that I have provided a telemetric transmitter for the first time with a simple mechanical-and-electrical construction, including a sealed mercury switch, that creates extremely accurate and yet powerful and reliable signalling indications dependent upon the quantity to be transmitted and requiring a minimum of effort to positively position said switch. It is also obvious to one skilled in the art that the above-mentioned unitary means coact to provide a new result—an uninterrupted signalling impulse of a time-duration accurately dependent upon a quantity in spite of minor instantaneous changes thereof. In the past, this result has only been partially achieved, at best, by the complication of separate relays having various electrical and/or mechanical holding, locking, detent and release additional means.

By providing displacers 17 of different diameters for use interchangeably in the leg 16, it will be seen that the relation between the effective areas of the U-tube legs 14 and 16 may be varied as desired, and the maximum difference in level between the manometric liquid surfaces in said legs thereby varied over wide ranges. A number of predetermined relations between pressure differential and meter response may thus be obtained. For example, one displacer may be of such diameter as to result in a differential pressure of forty inches of water-under-air for a maximum signal duration, another of such diameter as to produce a sixty inch differential for said maximum, and still another a one hundred and twenty inch differential.

This displacer may also be used instead of a test manometer for setting the instrument for accurate operation at low rates as follows: The pressure differential is first brought to zero. This can be done in practice, where a rate of flow meter is used, by stopping the flow. The displacer handle 15 is then turned to screw the displacer 17 up until a signal of six (6) seconds, say, is produced due to the resulting change in the height of manometric liquid surface 34 and float 32. This corresponds to one-tenth the maximum rate of flow where a one minute (60 seconds) cycle of operation is used. This six second signal indicates that the displacer is now raised exactly four turns, say, above its proper position. Consequently, by turning the displacer down this pre-determined known amount (four turns) the instrument is properly adjusted at zero. It is obvious, especially with a square root cam, that the signalling indications near the zero point are so sensitively responsive to the minutest departure therefrom and/or to vibration or other incidental causes, that it is not advisable to attempt to set the meter at this point where no signalling indication is produced.

The subject matter disclosed but not claimed herein, is claimed in applicant's earlier filed application Serial No. 621,022, filed July 6, 1932.

It is understood that my invention is not limited to the specific embodiment shown and that various deviations may be made therefrom without departing from the spirit and scope of the appended claims. For example while I have shown fluid rate of flow, requiring a square-root cam, as the variable to be telemetered it is obvious that the pressure differential itself, or any other quantity, may be similarly telemetered.

What I claim is:

1. In a telemetric transmitter, means displaceable an extent proportional to a quantity, driving means operable at constant speed, means cyclically movable thereby and adapted to coact with said displaceable means for a portion of each cycle corresponding with the displacement of said displaceable means, and a sealed switch having a portion movable therein in response to the coaction of said displaceable and cyclically movable means to a position for changing the electrical condition of a circuit for a time duration corresponding to either an increased or a decreased value of said quantity, said cyclically movable means and said displaceable means cooperating to cause the maintaining of said movable switch portion continuously in said position throughout said time duration uninfluenced by minor instantaneous variations in said quantity at either end of said time duration.

2. A device responsive to a fluid-transmitted quantity, said device comprising a chamber containing said fluid, a switch in said chamber and submerged in said fluid, means responsive to said fluid to correspond with said fluid-transmitted quantity and means cooperating with said fluid-responsive means and operatively connected to said switch to control the contact of said switch for a time duration uninfluenced by minor instantaneous variations in said quantity at either end of said time duration.

3. In a telemetric transmitter for transmitting the square root of a quantity, a float on a liquid surface positionable substantially proportionately to said quantity, a member movable in square root cycles, a counterweighted sealed conducting liquid switch pivotally mounted on said member and having contact points connected to an electric circuit and adapted when tilted in opposite directions to have the conducting liquid flow to contact and free said contacts respectively to make and break said circuit, a weighted constrained member depending from said switch on the opposite end from said counterweight and operating to permit said switch to be tilted by said counterweight when released from said weighted member, said weighted member having a stem depending therefrom adapted to contact said float to lift said weighted member free of said switch during a portion of said square root cycle.

4. In a transmitter for telemetering a quantity, means positioned responsive to a quantity, time positioned means, a sealed switch containing a movable member and mechanically operated under control of said time positioned means for a time interval dependent upon the position of said quantity responsive means, said movable switch member being adapted to maintain said switch in its then condition regardless of small instantaneous variations of said quantity.

5. In a contact controller sensitively responsive to a quantity, means positioned responsive to said quantity, time responsive means coacting therewith, sealed switch means gravitationally controlling a contact upon being tilted by said quantity and time responsive means upon their coaction, a portion of said switch means being so related to another that they tend to remain in their then tilted position despite minor instantaneous displacements of said quantity responsive means during coaction with said time responsive means.

6. In a contact controller sensitively responsive to a quantity, means responsive to said quantity, time responsive means adapted to coact with said quantity-responsive means, a switch having means movable therein to control a contact for sending a signal of a time duration corresponding with said quantity upon displacement of said movable means by said other means, said movable means being adapted to remain in its then condition despite minor instantaneous displacements of said quantity responsive means at either end of said signal.

7. In a telemetric transmitter, means displaceable an extent proportional to a quantity, driving means operable at constant speed, means cyclically movable thereby and adapted to coact with said displaceable means for a portion of said cycle corresponding with the displacement of said displaceable means, a switch having a portion movable therein, and means controlled by said coaction of said displaceable and cyclically movable means for causing said movable switch portion to assume in each cycle a position for changing the electrical condition of a circuit and for causing said movable switch portion to be maintained in said position for a time duration corresponding with said quantity and uninfluenced by minor instantaneous variations in said quantity at either end of said time duration.

8. Apparatus for telemetering a quantity, said apparatus comprising means positionable in accordance with said quantity, a sealed switch having a movable portion controlling a telemetering circuit, cyclically operable means, means controlled jointly by said cyclically operable means and said positionable means for shifting said movable switch portion to a position for changing the condition of said circuit in each of a series of cycles for a time duration corresponding to said quantity, said switch-portion shifting-means being so constructed and arranged as to be uninfluenced by minor instantaneous changes in the position of said positionable means following shifting of said switch portion by said shifting means under the joint control of said positionable means and said cyclically movable means.

9. Apparatus for telemetering a quantity, said apparatus comprising means positionable in accordance with said quantity, a switch having a movable portion controlling a telemetering circuit, cyclically operable means, means controlled jointly by said cyclically operable means and said positionable means for shifting said movable switch portion to a position for changing the condition of said circuit in each of a series of cycles for a time duration corresponding to said quantity, said positionable means being adapted to move with respect to said switch-portion shifting-means in portions of said cycles without moving said shifting means.

10. Apparatus for telemetering a quantity, said apparatus comprising a sealed switch having a movable portion controlling a telemetric circuit, an element positionable in accordance with said quantity, and cyclically operable means cooperating with said element for causing said movable portion of said sealed switch to move to a position for changing the condition of said circuit to produce a signal in each of a series of cycles for a time duration corresponding to said quantity, said positionable element being adapted to move with respect to said cyclically operable means in portions of said cycles at either end of said signals without affecting the time duration of the signals produced by said movable portion of said switch.

11. In a telemetric transmitter, means positionable substantially proportionally to values of a quantity, cyclically operable means, and means cooperating with said positionable means and said cyclically operable means for causing the production of a signal in each of a series of cycles of a time duration corresponding to a value of said quantity, the second mentioned means comprising a cam and the third mentioned means comprising a sealed conducting liquid switch operated by said cam and maintained in operated position for a period in each cycle uninfluenced by minor instantaneous variations in said quantity at either end of said time duration.

JOHN C. THORESEN.

CERTIFICATE OF CORRECTION.

Patent No. 2,111,679.  March 22, 1938.

JOHN C. THORESEN.

It is hereby certified that error appears in the printed specification of the above numbered patent requiring correction as follows: Page 4, first column, line 37, claim 7, for "said" second occurrence, read each; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.

positioned means, a sealed switch containing a movable member and mechanically operated under control of said time positioned means for a time interval dependent upon the position of said quantity responsive means, said movable switch member being adapted to maintain said switch in its then condition regardless of small instantaneous variations of said quantity.

5. In a contact controller sensitively responsive to a quantity, means positioned responsive to said quantity, time responsive means coacting therewith, sealed switch means gravitationally controlling a contact upon being tilted by said quantity and time responsive means upon their coaction, a portion of said switch means being so related to another that they tend to remain in their then tilted position despite minor instantaneous displacements of said quantity responsive means during coaction with said time responsive means.

6. In a contact controller sensitively responsive to a quantity, means responsive to said quantity, time responsive means adapted to coact with said quantity-responsive means, a switch having a means movable therein to control a contact for sending a signal of a time duration corresponding with said quantity upon displacement of said movable means by said other means, said movable means being adapted to remain in its then condition despite minor instantaneous displacements of said quantity responsive means at either end of said signal.

7. In a telemetric transmitter, means displaceable an extent proportional to a quantity, driving means operable at constant speed, means cyclically movable thereby and adapted to coact with said displaceable means for a portion of said cycle corresponding with the displacement of said displaceable means, a switch having a portion movable therein, and means controlled by said coaction of said displaceable and cyclically movable means for causing said movable switch portion to assume in each cycle a position for changing the electrical condition of a circuit and for causing said movable switch portion to be maintained in said position for a time duration corresponding with said quantity and uninfluenced by minor instantaneous variations in said quantity at either end of said time duration.

8. Apparatus for telemetering a quantity, said apparatus comprising means positionable in accordance with said quantity, a sealed switch having a movable portion controlling a telemetering circuit, cyclically operable means, means controlled jointly by said cyclically operable means and said positionable means for shifting said movable switch portion to a position for changing the condition of said circuit in each of a series of cycles for a time duration corresponding to said quantity, said switch-portion shifting-means being so constructed and arranged as to be uninfluenced by minor instantaneous changes in the position of said positionable means following shifting of said switch portion by said shifting means under the joint control of said positionable means and said cyclically movable means.

9. Apparatus for telemetering a quantity, said apparatus comprising means positionable in accordance with said quantity, a switch having a movable portion controlling a telemetering circuit, cyclically operable means, means controlled jointly by said cyclically operable means and said positionable means for shifting said movable switch portion to a position for changing the condition of said circuit in each of a series of cycles for a time duration corresponding to said quantity, said positionable means being adapted to move with respect to said switch-portion shifting-means in portions of said cycles without moving said shifting means.

10. Apparatus for telemetering a quantity, said apparatus comprising a sealed switch having a movable portion controlling a telemetric circuit, an element positionable in accordance with said quantity, and cyclically operable means cooperating with said element for causing said movable portion of said sealed switch to move to a position for changing the condition of said circuit to produce a signal in each of a series of cycles for a time duration corresponding to said quantity, said positionable element being adapted to move with respect to said cyclically operable means in portions of said cycles at either end of said signals without affecting the time duration of the signals produced by said movable portion of said switch.

11. In a telemetric transmitter, means positionable substantially proportionally to values of a quantity, cyclically operable means, and means cooperating with said positionable means and said cyclically operable means for causing the production of a signal in each of a series of cycles of a time duration corresponding to a value of said quantity, the second mentioned means comprising a cam and the third mentioned means comprising a sealed conducting liquid switch operated by said cam and maintained in operated position for a period in each cycle uninfluenced by minor instantaneous variations in said quantity at either end of said time duration.

JOHN C. THORESEN.

CERTIFICATE OF CORRECTION.

Patent No. 2,111,679.      March 22, 1938.

JOHN C. THORESEN.

It is hereby certified that error appears in the printed specification of the above numbered patent requiring correction as follows: Page 4, first column, line 37, claim 7, for "said" second occurrence, read each; and that the said Letters Patent should be read with this correction therein that the same may conform to the record of the case in the Patent Office.

Signed and sealed this 31st day of May, A. D. 1938.

(Seal)      Henry Van Arsdale,
Acting Commissioner of Patents.

CERTIFICATE OF CORRECTION.

Patent No. 2,111,679. March 22, 1938.

JOHN C. THORESEN.

It is hereby certified that error appears in the printed specification of the above numbered patent requiring correction as follows: Page 4, first column, line 37, claim 7, for "said" second occurrence, read each; and that the said Letters Patent should be read with this correction therein that the same may conform to the record of the case in the Patent Office.

Signed and sealed this 31st day of May, A. D. 1938.

(Seal)

Henry Van Arsdale,
Acting Commissioner of Patents.